US006954793B2

(12) United States Patent
Ramaswamy et al.

(10) Patent No.: US 6,954,793 B2
(45) Date of Patent: Oct. 11, 2005

(54) PRE-PAID DATA CARD AUTHENTICATION IN A PUBLIC WIRELESS LAN ACCESS SYSTEM

(75) Inventors: Kumar Ramaswamy, Plainsboro, NJ (US); Charles Chuanming Wang, Jamison, PA (US); Junbaio Zhang, Bridgewater, NJ (US); Sachin Satish Mody, Lawerenceville, NJ (US)

(73) Assignee: Thomson Licensing S.A., Boulogne (FR)

( * ) Notice: Subject to any disclaimer, the term of this patent is extended or adjusted under 35 U.S.C. 154(b) by 459 days.

(21) Appl. No.: 10/183,081

(22) Filed: Jun. 27, 2002

(65) Prior Publication Data

US 2004/0002923 A1 Jan. 1, 2004

Related U.S. Application Data

(60) Provisional application No. 60/378,031, filed on May 13, 2002.

(51) Int. Cl.[7] .............................................. G06F 15/173
(52) U.S. Cl. ...................... 709/229; 709/223; 709/224; 709/225; 709/226; 713/200; 713/201; 713/202; 713/155; 713/156; 705/51; 705/52; 705/64; 705/72; 705/77; 705/78; 705/79
(58) Field of Search .............................. 455/406–411; 705/64–79, 50, 51, 52; 713/200–202, 150, 155, 156; 709/229, 223–228; 718/101

(56) References Cited

U.S. PATENT DOCUMENTS

| 4,706,275 A | 11/1987 | Kamil ........................ 379/144 |
| 2003/0051041 A1 * | 3/2003 | Kalavade et al. ........... 709/229 |

FOREIGN PATENT DOCUMENTS

| EP | 1 178 644 A2 | 2/2002 | .......... H04L/29/06 |
| WO | WO 00/69113 | 11/2000 | ............. H04L/9/08 |
| WO | WO 01/54379 A1 | 7/2001 | .......... H04L/29/06 |
| WO | WO 01/76134 A1 | 10/2001 | ............. H04L/9/32 |
| WO | WO 02/05520 A2 | 1/2002 | |

OTHER PUBLICATIONS

Sophia Antipolia; 3GPP TS 23.101 V.4.0.0 (Apr. 2001), Valbonne–France, Unitech; *Unitech Solutions Introducing Unitech Subscriber Solutions* (May 17, 2002) USA.

Bizwatch; *GRIC Offers Prepaid Wireless Service to Network and Corporate Customers Through Mind CTI* (Oct. 29, 2001) USA.

* cited by examiner

*Primary Examiner*—James P. Tramme, II
*Assistant Examiner*—Jalatee Worjloh
(74) *Attorney, Agent, or Firm*—Joseph S. Tripoli; Joseph J. Laks; Robert B. Levy

(57) ABSTRACT

A user ($12_1$, $12_2$) can gain access to a Local Area Network (LAN) (20) on a fee basis without the risk of having to transmit an un-encrypted PIN at upon initial access. The user initially sends a request to the LAN identifying a Billing Agent (26) that maintains an account associated with the user for payment of LAN access charges. In practice, the account can take the form of a pre-paid account identified only by a PIN known to the user. After the user has identified the Billing Agent, the LAN queries the Billing Agent for its digital certificate, which the LAN forwards to the user. The user utilizes the certificate to encrypt a PIN for transmission via the LAN to the Billing Agent for authentication. Upon successful authentication, the Billing Agent authorizes the LAN to grant access to the user, thus allowing the user to obtain a connection via the LAN to a private network (14) or a public network (16).

20 Claims, 2 Drawing Sheets

PRE-PAID DATA CARD AUTHENTICATION IN A PUBLIC WIRELESS LAN ACCESS SYSTEM

CROSS REFERENCE TO RELATED APPLICATION

This application claims priority under 35 U.S.C. 119(e) to U.S. Provisional Patent Application No. 60/378,031, filed May 13, 2002, the teachings of which are incorporated herein.

TECHNICAL FIELD

This invention relates to a technique for enabling a user to gain access to a network, and particularly, a public network such as the Internet, through a Local Area Network on a paid basis.

BACKGROUND ART

Presently, many providers of telephony service offer subscribers the ability to pay in advance. A subscriber seeking pre-paid telephony service first enrolls with a telephony service provider by depositing a certain sum of money. The service provider then credits this amount to a pre-paid service account identified by a Personal Identification Number (PIN) unique to the subscriber. Many providers of pre-paid telephony service have greatly simplified the enrollment process by offering pre-paid cards that have a particular currency denomination corresponding to a certain amount of service (i.e., a prescribed number of minutes). The card itself carries the PIN identifying the corresponding pre-paid account maintained by the telephony service provider for pre-paid service. Additionally, the card carries an access telephone number that the subscriber dials to reach a pre-paid service platform in the telephone service provider's network.

To obtain pre-paid telephony service, the subscriber dials the access number, whereupon the telephony service provider prompts the subscriber for the PIN. The service provider then undertakes verification of the PIN as well as validation of the account to ensure that a sufficient credit balance exists. Upon successful verification of the PIN and validation of the account, the telephony service provider prompts the subscriber for the telephone number of the called party. Once the subscriber enters the number, the telephony service sets up the call to the called party, and during the course of the call, the service provider debits the pre-paid account by the cost of each incremental call unit (e.g., each minute of the call.) Should the account balance fall below the cost of the next incremental call unit, the telephony service provider will terminate the call, or alternatively, offer the subscriber the opportunity to replenish the pre-paid account balance.

Pre-paid telephony service currently enjoys tremendous popularity, due in part to the relative security afforded to subscribers by the Public Switched Telephone Network. Generally, little risk exists that an unauthorized person can intercept the PIN entered by the subscriber in connection with a pre-paid call made from a wired telephone set. However, the risk increases substantially when the subscriber utilizes an analog cordless telephone to place the pre-paid call since such cordless telephones radiate an RF signal that is easily intercepted.

The problem of potential interception of personal identification data transmitted across a wireless link also exists in connection with other types of prepaid telecommunications service. Currently, some service providers offer fee-based wireless LAN access that allow users to gain access through the LAN to a private data network or a public data network such as the Internet. Such wireless LANS have begun to emerge at various publicly accessible facilities, such as rest stops, cafes, and libraries for example. Upon entering such a publicly accessible facility, the user establishes a communication link with an access point, usually over a wireless channel to gain access to the LAN, and a public or private network therebeyond. When initiating a communications session with the wireless LAN, the user needs to provide a PIN that identifies the pre-paid account or a credit card account number to provide payment for access fees. Often, the transmission of the PIN occurs without any encryption because the user is accessing the wireless LAN for the first time. Thus, in the absence of any prior relationship with the subscriber, the LAN lacks any key by which to decrypt an encrypted subscriber transmission. An unencrypted transmission of sensitive information such as a PIN creates a serious security risk since hackers can often readily intercept wireless LAN traffic.

Thus, there is need for a technique for that enables secure authentication of a wireless LAN user.

BRIEF SUMMARY OF THE INVENTION

Briefly, in accordance with present principles, a method is provided for enabling a user to obtain secure access to a LAN, and more particularly, a wireless LAN, to enable the user to establish a communications session with the LAN to access a public or private data network. In accordance with the method, a user seeking access does so by entering a request that identifies a Billing Agent that will provide payment to the operator of the LAN. (The Billing Agent and LAN operator can be the same entity or different entities.) The LAN then queries the Billing Agent to obtain a copy of the agent's digital certificate for transmission to the user. The user verifies the certificate, and then encrypts his/her PIN in accordance with the certificate. The LAN forwards the user's encrypted PIN to the Billing Agent for authentication. Upon successful authentication of the user, the Billing Agent informs the LAN which then extends service. At the completion of access by the user, the LAN accumulates the access charges for receipt by the Billing Agent, which debits the user's account accordingly.

The access method of the present principles eliminates the risk of having the user sending an un-encrypted PIN to the LAN. Rather, with the present method, the user encrypts his/her PIN in accordance with the Billing Agent's digital certificate.

DETAILED DESCRIPTION

Figure 1:
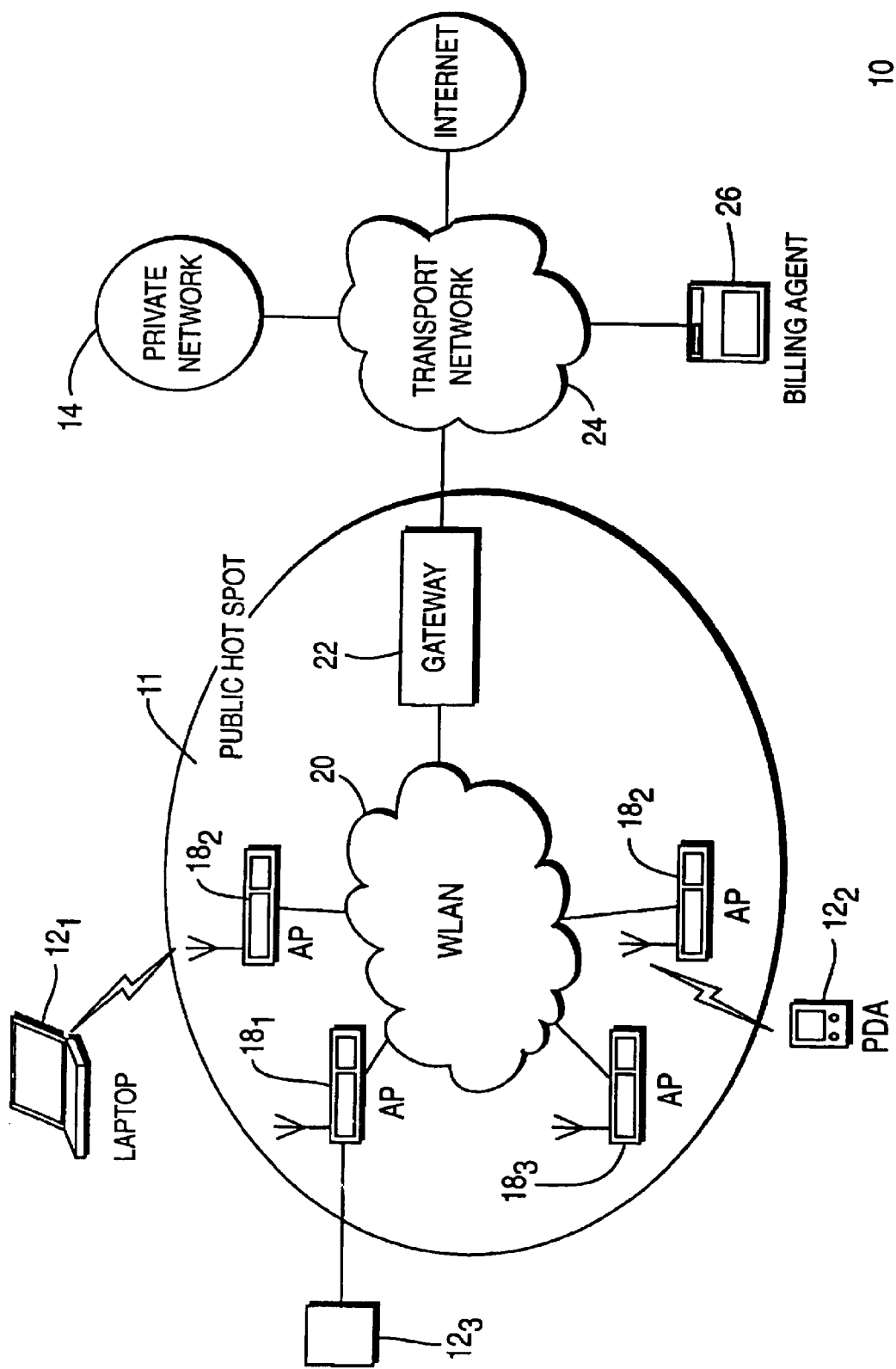
FIG. 1 depicts a block schematic diagram of a Wireless Local Area Network (WLAN) accessed in accordance with the present principles.

FIG. 1 depicts a block schematic diagram of a network 10 that includes an access arrangement 11 that enables at least one user, and preferably a plurality of users (e.g., users 12$_1$, 12$_2$, and 12$_3$) to securely access either a private data network 14 or a public data network 16, such as the Internet, in accordance with present principles. In a preferred embodiment, the user 12$_1$ utilizes a lap top computer to communicate with the access arrangement 11, where the user $12_2$ utilizes a Personal Data Assistant and the user $12_3$ utilizes a wired connection. Other users (not shown) could employ other types of wired or wireless communication appliances.

The access arrangement of FIG. 1 includes at least one, and preferably, a plurality of access points (e.g., access points $18_1$–$18_4$) via which each of the users $12_1$, $12_2$ and $12_3$ accesses a Wireless Local Area Network (WLAN) 20. A gateway 22 provides a communication path between the WLAN 20 and a transport network 24 having links to the private and public networks 14 and 16, respectively. In the illustrated embodiment, each access point, such as access point $18_1$, includes a wireless transceiver (not shown) for exchanging radio frequency signals with a radio transceiver within a communication device employed by a user, such one of users $12_1$ and $12_2$. One or more of the access points $18_1$–$18_4$ could also include a wired access mechanism by which a user, such as user $12_3$, can access the network. To this end, each of the access point $18_1$–$18_4$s employs a well-known wireless or wired data exchange protocol, such as the "HiperLan 2" or IEEE 802.11 protocol. Indeed, different access points can employ different wireless protocols to accommodate users whose communications devices use different wireless protocols.

Heretofore, a user seeking to access one of the networks 14 and 16 did so by first establishing a billing relationship with the operator of the LAN. A user accessing WLAN 20, for the first time would send a PIN associated with a pre-paid account or a credit card number, so that the LAN operator could bill for the associated access charges, typically on a per minute basis, or on the basis of the quantity of information sent such as a per Mbyte basis. After receiving the user's PIN, the WLAN 20 forwards the information to a Billing Agent 26 via a message launched into the transport network 24. The Billing Agent 26 undertakes authentication of the user. Assuming successful authentication, the operator of the WLAN 20 afford the user access to enable the user to establish a link with one of the networks 14 and 16.

In absence of any prior relationship with the WLAN 20, a user seeking access for the first time has no other choice but to send an unencrypted PIN. Absent a prior relationship with a user, the WLAN 20 would not have any advance knowledge of the scheme utilized by the user to encrypt his/her PIN. Such un-encrypted transmission of sensitive information incurs the risk that hackers will intercept such information to commit a subsequent fraud. The risk of interception is particularly high for wireless transmissions.

In accordance with present principles, there is provided a method for enabling a user, such as user $12_1$, to gain access to the WLAN 20. As discussed in greater detail, the user achieves secure access by first obtaining from the Billing Agent 26 the agent's digital certificate, and then encrypting the user's PIN in accordance with the certificate to enable verification and validation. (Note that while FIG. 1 depicts a single Billing Agent 26, multiple Billing Agents can exist to serve different users.)

Figure 2:
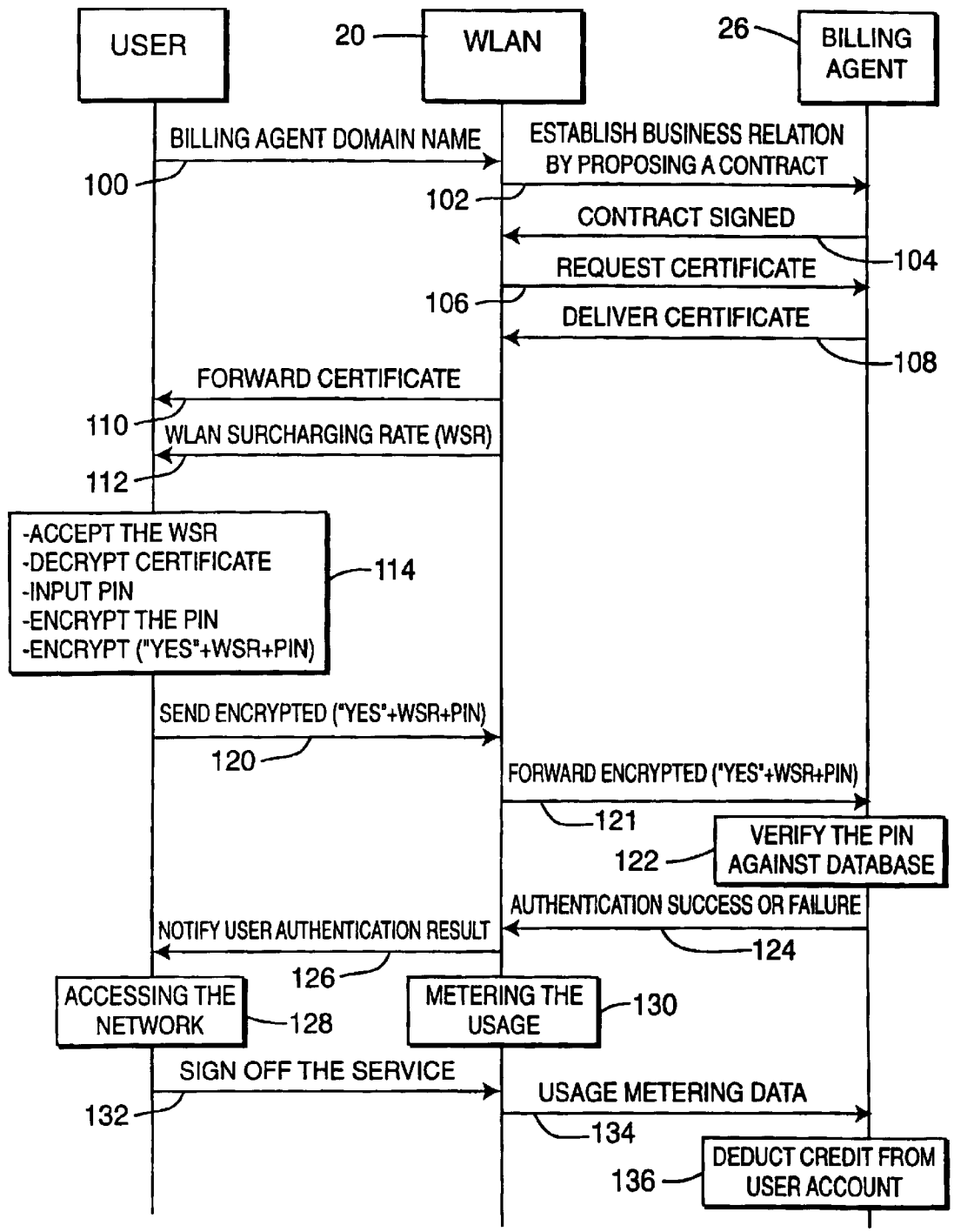
FIG. 2 depicts a ladder diagram illustrating the data flow among elements of the WLAN of FIG. 1.

FIG. 2 depicts the flow of communications among the user; the WLAN 20; and the Billing Agent 26, to afford the user secure access in accordance with present principles. (As will be appreciated hereinafter, the communications flow in FIG. 2 actually occurs with the user's communication device, so it should be understood that term "user" in some instances refers to a device, rather than the person operating the device.) Referring to FIG. 2, the user initiates the access by transmitting to the WLAN 20 of FIG. 1, the domain name of the Billing Agent 26 of FIG. 1 during step 100 of FIG. 2. In practice, the user sends the domain name to the WLAN 20 in the form of message such as http://www.billingagent.com or as user@billingagent.com, where the domain name is everything that follows the '@' symbol. Upon receipt of the domain name of the Billing Agent 26, the WLAN 20 determines whether it has an established business relation with the identified Billing Agent. As discussed above, multiple Billing Agents may exist, not all of which have relationships with the LAN 20. If no previous business relationship exists with the identified Billing Agent 26, then the WLAN 20 establishes relationship by first proposing contractual terms to the Billing Agent 26 during step 102. Such contractual terms typically include WLAN surcharge rate (WSR). The WSR represents the rate, either on per minute or per data amount basis that the WLAN 20 expects to charge the user and hence, the rate of reimbursement expected from Billing Agent 26. Upon finding the contract terms acceptable, the Billing Agent 26 sends back a signed contract (or such other acknowledgement) during step 104. The contract can be signed digitally by machine rather than by a human being.

Next, the WLAN 20 requests from the Billing Agent 26 its digital certificate during step 106, whereupon the Billing Agent delivers the certificate to the WLAN 20 during step 108. The Billing Agent's digital certificate constitutes a data file that includes the public key of the Billing Agent, which a receiving entity (i.e., the user) can use to encrypt information for decryption by the Billing Agent, thus allowing for information exchange in a secure manner. The WLAN 20 forwards the Billing Agent's certificate to the user during step 110. Thereafter, the WLAN 20 sends to the user the proposed WSR.

After receiving the Billing Agent's certificate and the WSR, the user then decides whether to accept the access charges demanded by the WLAN 20. If the user accepts, then during step 114, the user does the following: (1) verifies the certificate, (2) inputs a PIN, and (3) encrypts the PIN in accordance with the Billing Agent's certificate. The user verifies the certificate using a trusted party's public key to make sure that 1) the certificate is indeed issued by the trusted party, and 2) the certificate hasn't been altered by anybody else Encryption of the PIN in accordance with the Billing Agent's certificate entails encrypting the PIN using the public key identified in the certificate or encrypting the PIN using a shared secret negotiated between the Billing Agent and the user as part of the certificate request process or the Transparent LAN Service (TLS) handshake protocol. In addition to encrypting the PIN during step 114, the user will typically encrypt a triplet that includes the word "yes" to indicate acceptance of the WSR, the WSR itself, and the PIN during step 114 to enable the Billing Agent 26 to more readily perform subsequent user validation. Note that encrypting the WSR and the word "yes" isn't critical for WLAN access. To avoid replay attacks from taking place, the Billing Agent 26 may also send a random number, which can then be combined with the PIN prior to encrypting it, or a hash can be formed using the PIN and the random number. The random number should be unique for every authentication session involving the Billing Agent.

The user sends the encrypted triplet to the WLAN 20 during step 120 of FIG. 2, whereupon the WLAN forwards the encrypted triplet to the Billing Agent 26 during step 121. The Billing Agent 26 verifies the PIN during step 122. For pre-payment of access charges, the Billing Agent 26 will typically validate the user's account (i.e., the pre-paid account) to establish that a sufficient balance exists that at least equals the WSR for either an initial interval or for an initial transmission volume. For credit card charges, the Billing Agent will typically validate the user's card number.

During step 124, the Billing Agent 26 notifies the WLAN 20 of the results of the authentication performed during step 122. In turn, the WLAN 20 forwards the authentication results to the user during step 126. Upon successful authentication, the user thereafter accesses the WLAN 20 during step 128 to reach one of the private or public networks 14 and 16, respectively of FIG. 1. The Billing Agent 26 can also send the credit balance information to the user as part of the authentication success message, to let the user know about the remaining balance on the account. As the user accesses the WLAN 20, a record is made during step 130 of the usage, either in terms of time spent or data volume send, depending on the WSR agreed to by the user during step 114. Ultimately, the user will have completed access and then sign off (step 132). Thereafter, the WLAN forwards the metering data gathered during step 132 to the Billing Agent 26 during step 134, whereupon the Billing Agent debits the user's account accordingly during step 136. Although FIG. 2 depicts that the debiting step 136 occurs after signoff, the debiting could occur during network access. In other words, the debiting could occur during the metering step 130.

The foregoing describes a technique for enabling a user to gain secure access to a network, and particularly, a public network such as the Internet, through a Local Area Network on a paid basis.

What is claimed is:

1. A method for providing access to a Local Area Network (LAN), comprising the steps of:
    receiving in the LAN a request from a user for access, the request including identification of a Billing Agent that maintains an account debited in accordance with access charges incurred by the user;
    querying the Billing Agent to obtain its authenticating certificate and forwarding the certificate to the user;
    receiving from the user a Personal Identifier (PIN) encrypted in accordance with the Billing agent's authenticating certificate;
    forwarding the PIN to the Billing Agent for authentication, and upon successful authentication;
    granting the user access to the LAN while charging for such user access.

2. The method according to claim 1 wherein the charging step includes the steps of:
    accumulating a charge for user access; and
    forwarding the accumulated charge for user access to the Billing agent, which debits the user's account accordingly.

3. The method according to claim 1 wherein the step of granting LAN access includes the sub-steps of:
    alerting the user of billing rate for LAN access; and
    receiving an acceptance from the user of the LAN billing rate.

4. The method according to claim 1 wherein the step of querying the Billing Agent includes the sub-step of establishing a business relationship with the Billing Agent if no relationship previously exists between the Billing Agent and the LAN.

5. The method according to claim 4 wherein the LAN establishes a business relationship with he Billing agent by the steps of:
    proposing a contractual terms to the Billing Agent and digitally signing the terms; and
    receiving acceptance by the Billing agent of the contractual terms.

6. The method according to claim 3 wherein the step of receiving the PIN further includes the step of receiving from user an encrypted triplet that includes: (a) the billing rate for LAN access, (b) the acceptance of the Billing Rate; and (c) the PIN.

7. The method according to claim 1 wherein the LAN receives the request for user access and he encrypted PIN over a wireless channel.

8. The method according to claim 1 including the step of establishing a pre-paid balance on the account maintained by the Billing Agent.

9. A method for providing access to a Local Area Network (LAN), comprising the steps of:
    receiving in the LAN a request from a user for access, the request including identification of a Billing Agent that maintains an account debited in accordance with access charges incurred by the user;
    querying the Billing Agent to obtain its authenticating certificate and forwarding the certificate to the user;
    alerting the user of billing rate for LAN access;
    receiving an acceptance from the user of the LAN billing rate,
    receiving from the user a Personal Identifier (PIN) encrypted in accordance with the Billing agent's authenticating certificate;
    forwarding the PIN to the Billing Agent for authentication, and upon successful authentication;
    granting the user access to the LAN while accumulating a charge for such user access.

10. The method according to claim 9 further including the step of forwarding the accumulate charge for user access to the Billing agent, which debits the user's account accordingly.

11. The method according to claim 9 wherein the step of querying the Billing Agent includes the sub-step of establishing a business relationship with the Billing Agent if no relationship previously exists between the Billing Agent and the LAN.

12. The method according to claim 11 wherein the LAN establishes a business relationship with the Billing agent by the steps of:
    proposing a contractual terms to the Billing Agent; and
    receiving acceptance by the Billing agent of the contractual terms.

13. The method according to claim 9 wherein step of receiving the PIN includes the step of receiving from the user an encrypted triplet that includes: (a) the billing rate for LAN access, (b) the acceptance of the Billing Rate; and (c) the PIN.

14. The method according to claim 9 wherein the LAN receives the request for user access and the encrypted PIN over a wireless channel.

15. A method for billing for Local Area Network access charges, comprising the steps of:
    maintaining at a Billing agent an account associated with a user for LAN access charges incurred by the user
    receiving at the Billing Agent a request for authenticating certificate in after receipt by the LAN of a request from a user for access;
    receiving at the Billing Agent a Personal Identifier (PIN) for the user encrypted in accordance with the Billing agent's authenticating certificate;

authenticating the PIN at the Billing Agent, and upon successful authentication;

notifying the LAN to grant access to the user; and debiting the account in accordance with an accumulated access charge incurred by the user for access to the LAN.

16. The method according to claim 15 including the step of establishing a pre-paid balance on the account maintained by the Billing Agent.

17. Apparatus for providing a user access to data network on a fee basis, comprising:

a Billing Agent that maintains an account debited in accordance with access charges incurred by the user; and Local Area Network (LAN) means for (1) receiving a request from a user for access, the request including identification of the Billing Agent, (2) querying the Billing Agent to obtain its authenticating certificate and forwarding the certificate to the user; (3) receiving from the user a Personal Identifier (PIN) encrypted in accordance with the Billing agent's authenticating certificate; (4) forwarding the PIN to the Billing Agent for authentication, and upon successful authentication; and (5) granting the user access to the LAN while accumulating a charge for such user access.

18. The apparatus according to claim 17 wherein the Billing Agent debits the user's account in accordance with the accumulated access charge.

19. The apparatus according to claim 17 wherein the account maintained by the Billing Agent has a pre-paid balance.

20. The apparatus according to claim 17 wherein the LAN means includes at least one access point for enabling a user to communicate with the LAN means over a wireless channel.

* * * * *